(12) United States Patent
Ramaswamy et al.

(10) Patent No.: US 7,547,393 B2
(45) Date of Patent: Jun. 16, 2009

(54) MEMBRANE STRUCTURE AND METHOD OF MAKING

(75) Inventors: Vidya Ramaswamy, Niskayuna, NY (US); James Anthony Ruud, Delmar, NY (US); Anthony Yu-Chung Ku, Rexford, NY (US); William Hullinger Huber, Scotia, NY (US)

(73) Assignee: General Electric Company, Niskayuna, NY (US)

( * ) Notice: Subject to any disclaimer, the term of this patent is extended or adjusted under 35 U.S.C. 154(b) by 407 days.

(21) Appl. No.: 11/555,506

(22) Filed: Nov. 1, 2006

(65) Prior Publication Data

US 2007/0125702 A1 Jun. 7, 2007

Related U.S. Application Data

(63) Continuation-in-part of application No. 11/296,746, filed on Dec. 7, 2005.

(51) Int. Cl.
 *B01D 71/02* (2006.01)
 *B01D 71/06* (2006.01)
 *B01D 67/00* (2006.01)
 *B01D 69/00* (2006.01)
 *B01D 63/00* (2006.01)

(52) U.S. Cl. ............. 210/500.25; 210/500.27; 210/500.22; 210/503; 205/199; 205/200; 205/201

(58) Field of Classification Search ............ None
See application file for complete search history.

(56) References Cited

U.S. PATENT DOCUMENTS

| | | | |
|---|---|---|---|
| 5,514,378 A | | 5/1996 | Mikos et al. |
| 5,753,014 A | * | 5/1998 | Van Rijn .................. 96/12 |
| 5,968,326 A | | 10/1999 | Yelon et al. |
| 6,972,146 B2 | * | 12/2005 | Den et al. .................. 428/138 |
| 7,309,385 B2 | * | 12/2007 | Hong et al. .................. 96/11 |
| 2003/0047505 A1 | * | 3/2003 | Grimes et al. ............. 210/483 |

(Continued)

FOREIGN PATENT DOCUMENTS

EP 0242209 B1 6/1990

(Continued)

OTHER PUBLICATIONS

PCT International Search Report dated May 15, 2007.

*Primary Examiner*—Krishnan S Menon
(74) *Attorney, Agent, or Firm*—Paul J. DiConza

(57) ABSTRACT

A membrane structure is provided. The membrane structure includes a polymer layer having a plurality of pores; and a ceramic layer disposed on the polymer layer. The ceramic layer has a plurality of substantially unconnected pores. Each of the substantially unconnected pores is in fluid communication with at least one of the pores of the polymer layer. A method of manufacturing a membrane structure is provided. The method includes the steps of providing a polymer layer having a plurality of pores; and disposing a ceramic layer on the polymer layer. Disposing a ceramic layer includes depositing a metal layer on the polymer layer; and anodizing the metal layer to convert the metal layer into a porous layer. At least one of the depositing step and the anodizing step is performed as a continuous process. Alternatively, at least one of the depositing and the anodizing step is performed as a batch process.

11 Claims, 7 Drawing Sheets

U.S. PATENT DOCUMENTS

| | | |
|---|---|---|
| 2005/0061663 A1 | 3/2005 | Chen et al. |
| 2005/0087491 A1 | 4/2005 | Hennige et al. |

FOREIGN PATENT DOCUMENTS

| | | |
|---|---|---|
| EP | 0381512 A2 | 8/1990 |
| EP | 0494187 B1 | 7/1994 |
| WO | WO 91/04785 | 4/1991 |
| WO | WO9323154 A1 | 11/1993 |
| WO | WO9922843 A1 | 5/1999 |

\* cited by examiner

US 7,547,393 B2

MEMBRANE STRUCTURE AND METHOD OF MAKING

CROSS REFERENCE TO RELATED APPLICATIONS

This application is a continuation-in-part of U.S. patent application Ser. No. 11/296,746, entitled "MEMBRANE STRUCTURE AND METHOD OF MAKING", filed on Dec. 7, 2005, which is herein incorporated by reference.

BACKGROUND

The invention relates generally to membrane structures. More particularly, the invention relates to membrane structures having substantially high flux and substantially high selectivity. The invention also relates to a method of manufacturing membrane structures, on an industrial scale.

Porous membrane structures are extensively used in filtration, separation, catalysis, detection, and sensor applications. Membrane structures with extremely fine pore sizes may be required for biofiltration and bioseparation applications. The selectivity of a membrane is typically determined by the membrane pore size—high selectivity membranes have small pores. However for a given thickness, the smaller the pore size, the smaller the membrane flux. Therefore, membrane layers with fine pores must be made thin to ensure sufficient permeate flux. Typically thin membranes with small pores are stacked on thicker substrates with coarser pores, which provide mechanical support but do not significantly increase the resistance to flow. In such membrane structures, it is extremely difficult to get a defect-free, interface between layers to ensure sufficient connectivity through the membrane structure. In spite of much effort, there is a demand for membrane structures with fine pores exhibiting substantially high permeance and high selectivity, along with methods to produce, on an industrial scale, such membrane structures.

SUMMARY OF THE INVENTION

The present invention meets these and other needs by providing a membrane structure, which has substantially high flux and high selectivity.

Accordingly, one aspect of the invention is to provide a membrane structure. The membrane structure includes a polymer layer having a plurality of pores; and a ceramic layer disposed on the polymer layer. The ceramic layer has a plurality of substantially unconnected pores. Each of the substantially unconnected pores of the ceramic layer is in fluid communication with at least one of the pores of the polymer layer. It will be apparent to those skilled in the art that structures having incidental numbers of defective pores of the ceramic layer that are not in fluid communication with at least one of the pores of the polymer layer are included within the scope of this embodiment, if the number of defects is not sufficient to substantially alter the performance of the structure relative to what would be expected for a defect-free structure. Thus the term "each" as used herein should be interpreted to mean all or substantially all of the pores, taken individually.

A second aspect of the invention is to provide a method of manufacturing a membrane structure. The method includes the steps of providing a polymer layer having a plurality of pores; and disposing a ceramic layer on the polymer layer. Disposing a ceramic layer includes depositing a metal layer on the polymer layer; and anodizing the metal layer to convert the metal layer into a porous layer. In some embodiments, at least one of the depositing step and the anodization step is performed as a continuous process.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
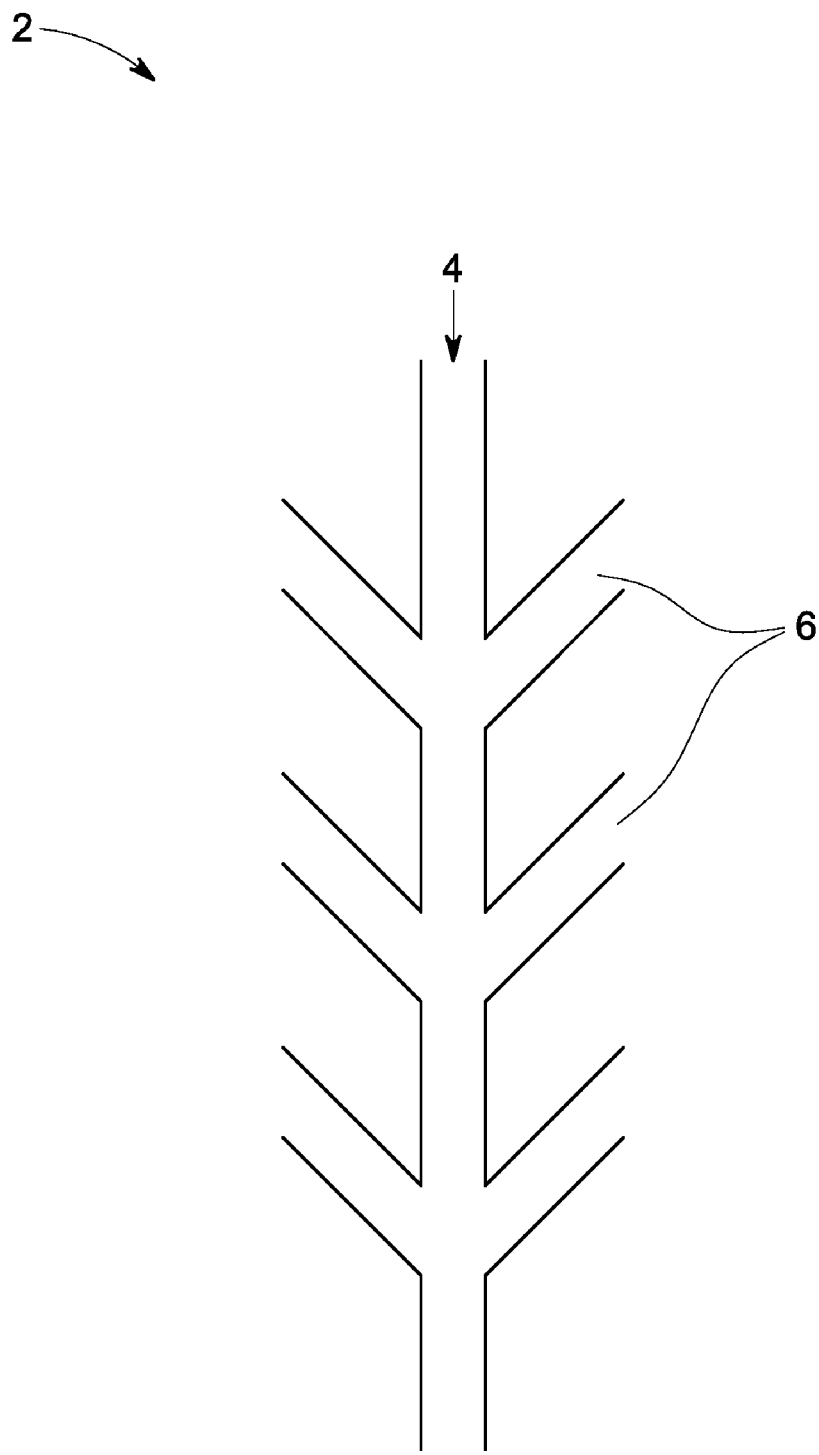
FIG. 1 is a schematic representation of a first-order branched pore structure, according to one embodiment of the present invention.

In the following description, like reference characters designate like or corresponding parts throughout the several views shown in the figures. It is also understood that terms such as "top," "bottom," "outward," "inward," "first," "second," and the like are words of convenience and are not to be construed as limiting terms. Furthermore, whenever a particular aspect of the invention is said to comprise or consist of at least one of a number of elements of a group and combinations thereof, it is understood that the aspect may comprise or consist of any of the elements of the group, either individually or in combination with any of the other elements of that group.

Referring to the drawings in general, it will be understood that the illustrations are for the purpose of describing one embodiment of the invention and are not intended to limit the invention thereto.

For the purposes of understanding the invention, the term "layer with substantially unconnected pores" is to be understood to be a porous layer in which pore connections are limited to, at most, a first-order branched structure 2, as illustrated in FIG. 1. A "first-order branched structure" as the term is used herein comprises one or more main stem pores 4 from which one or more branch pores 6 radiate, where a branch pore 6 has no junctions with any other pore aside from its junction with its main stem pore 4. Note that the term "layer with substantially unconnected pores" includes, in addition to first-order branched structures, structures with completely isolated pores, as in a structure consisting of parallel, substantially unconnected channels. Of course, one skilled in the art will recognize that an occasional defect is to be expected in fabricating such structures, and so a structure containing occasional defects (such as, for example, a small number of branch pores which join to other branch pores in violation of the above definition, or a small amount of connectivity between otherwise parallel, substantially unconnected pore channels) will still be considered a structure with substantially unconnected pores if the number of defects is not sufficient to substantially alter the performance of the structure relative to what would be expected for a defect-free structure.

Figure 2:
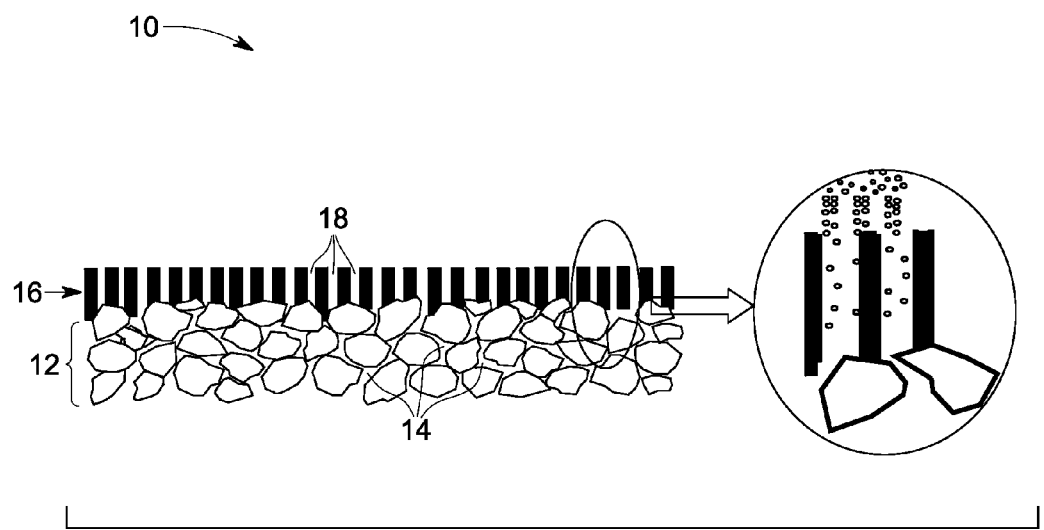
FIG. 2 is a schematic representation of a membrane structure, according to one embodiment of the present invention.

Schematic representation of a membrane structure according to one embodiment of the present invention is shown in FIG. 2. The membrane structure 10 of FIG. 2 includes a polymer layer 12 having a plurality of pores 14 and a ceramic layer 16 having a plurality of substantially unconnected pores 18 disposed on the polymer layer 12. Typically, each of the substantially unconnected pores of the ceramic layer 14 is in fluid communication with at least one of the pores of the polymer layer 12. The distinct connection between the layers establishes a registry between layers of the membrane structure and ensures high flux.

In some conventional membrane structures, the porous layers are sandwiched together to form a membrane structure. In such structures, the establishment of fluid communication among pores of different layers is accomplished by probability—the chances that pores will align in the structure as one layer is coated onto or otherwise applied to the other layer. This dependence on probability to establish pore alignment results in a large number of misaligned pores that end up isolated from, or substantially occluded from, the rest of the structure. Any such defect or other irregularity at the interface may reduce the flux through the membrane structure. Therefore, achieving a more definite connectivity between the layers is significant to a membrane's performance for separator or filter applications. The membrane structures of the present invention have been designed to substantially mitigate such connectivity problems.

Typically the polymer layer 12 includes a plurality of pores 14. In certain embodiments, the pores 14 of the polymer layer 12 are interconnected. In other embodiments, the pores 14 may be substantially unconnected as discussed above with respect to pores 18 of the ceramic layer 16. In one embodiment, the polymer layer 12 has a porosity volume fraction of at least about 5%. In another embodiment, the polymer layer 12 has a porosity volume fraction in the range from about 15% to about 90%. In yet another embodiment, the polymer layer 12 has a porosity volume fraction in the range from about 50% to about 70%.

The total thickness of the membrane structure 10 is chosen in such a way that the structure is thick enough for mechanical robustness, but not so thick as to impair permeability. The thickness of the individual layers is selected depending on the end-use application. In one embodiment, the ceramic layer 16 has a thickness less than about 10 micrometers. In another embodiment, the ceramic layer 16 has a thickness in the range from about 5 nanometers to about 500 nanometers. In another embodiment, the ceramic layer 16 has a thickness in the range from about 10 nanometers to about 100 nanometers.

Precise control over pore size and pore size distribution are among the parameters that define the membrane performance. The pore size of the layers is chosen based on the end use application of the membrane structure. In some embodiments, the ceramic layer 16 has a median pore size of less than about 1 micrometer. In other embodiments, the median pore size of the ceramic layer 16 is less than about 200 nanometers. In some other embodiments, the median pore size of the ceramic layer 16 is in a range from about 2 nanometers to about 50 nanometers.

In these embodiments, the median pore size of the polymer layer 12 is chosen so that the pores in the polymer layer do not hinder the permeance of the species through the membrane structure. The thickness and pore dimensions of the polymer layer 12 are chosen such that the flow resistance through the polymer layer is lower than or equal to the flow resistance through the ceramic layer.

In an exemplary embodiment, the ceramic layer 16 includes a plurality of cylindrical pores 18 of uniform size (to within expected degrees of processing variation), substantially all aligned approximately perpendicular to the membrane surface. Straight pores with low tortuosity facilitate high flux through the membrane structure.

The polymer layer 12 may comprise any polymer that is desirably chemically stable under the operating conditions. Suitable polymers that may be used include, but are not limited to, polysulphones, polyethersulphones, cellulose acetates, polyamides, cross-linked polyimides, polyether ketones, polyetherimides, silicone rubbers, nitrile rubbers, neoprene rubbers, silicones, polycarbonates, polyarylenes, polyphenylene ethers, polyolefin elastomers, polybutadienes, vinyl polymers, polyalkalyenes, fluoropolymers, combinations thereof, and copolymers thereof. In an exemplary embodiment, the polymer layer comprises polyvinylidene fluoride (PVDF). In another embodiment, the polymer layer comprises polyether sulfone. In yet another embodiment, the polymer layer comprises polytetrafluoroethylene. The use of a polymer layer 12 as a support layer facilitates easy production at high volume. Further, the polymer layer may be made biocompatible with relative ease.

In certain embodiments, the polymer may be modified to achieve specific properties. For example, for filtration applications, the polymer layer desirably has high permeability, has suitable levels of hydrophilicity, and is chemically resistant to the feed streams. Good anti-oxidation activities, strong thermal and hydrolytic stabilities, and desirable mechanical and film forming properties of polyvinylidene fluoride (PVDF) are advantageous for using layers of this material in membrane structures.

In certain embodiments, the performance of the polymer layer is improved by surface modification, chemical grafting, or by blending. For example, a hydrophilic component may be added to the polymer to increase its permeation performance. Examples of suitable organic materials for additives, include, but are not limited to, polymethyl acrylate (PMA), polymethylmethacrylate (PMMA), polyvinyl acetate, and cellulose acetate. In certain embodiments, the polymer layers may be blended with inorganic materials to achieve superior membrane properties. Blending of PVDF with inorganic particles such as alumina, silica, zirconia, and lithium salts have shown improved mechanical, water permeate fluxes, and anti-fouling performance compared to unmodified polymers. Additionally, the chemical resistance of the polymer layer may be improved by subjecting the polymer to a chemical modification such as cross-linking reaction or partial pyrolysis. These chemical modifications may be achieved by any means known in the art, such as by irradiating of the polymer with ultraviolet radiation, or with low-energy electron beams.

The material of the polymer layer 12 and the ceramic layer 16 are chosen based on the end use application. Typically, the ceramic layer 16 includes an oxide product of an anodization process. Some examples of such oxides include, but are not limited to, alumina, titania, silica, tin oxide, zirconia, yttria, niobium oxide, tungsten oxide, molybdenum oxide, tantalum oxide, and combinations of one or more of these. In some embodiments, the ceramic layer may include oxides of metal alloys of aluminum, titanium, tin, zirconium, yttrium, niobium, tungsten, molybdenum, or tantalum. In an exemplary embodiment, the ceramic layer includes alumina. In another embodiment, the ceramic layer includes titania. In another embodiment, the ceramic layer includes zirconia.

Such oxides have the advantages of thermal, chemical stability, good erosion resistance, and high-pressure stability. In all the above embodiments, any of the layers may include more than one sublayer. Anodized oxide layers are characterized by well-controlled pore size, high porosity, tunable thickness. They provide advantages of high selectivity through tight, tunable pore size distribution (particularly in the range from 5-50 nm); high flux (through smaller controllable layer thickness and high porosity >10%); and bio-compatibility (inherently and through surface modification).

Figure 3:
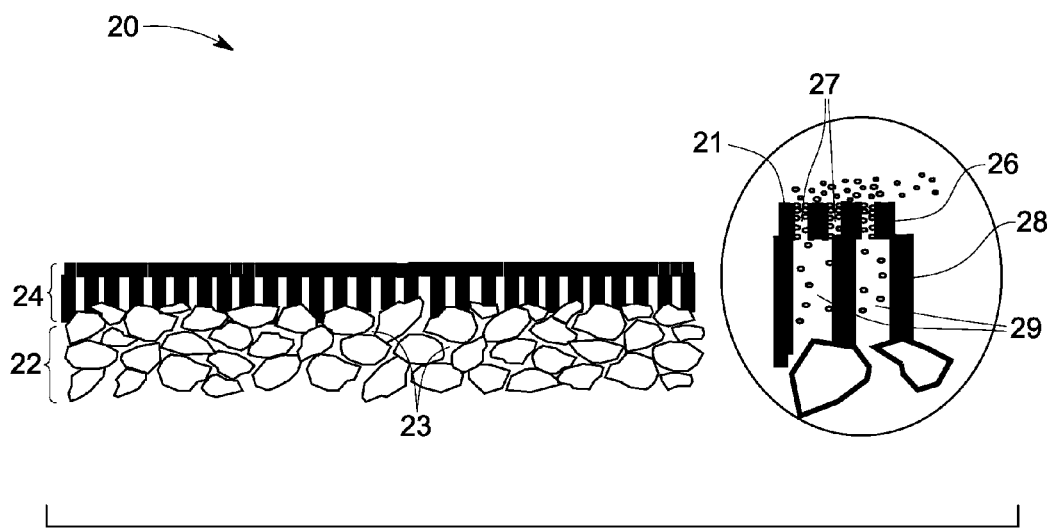
FIG. 3 is a schematic representation of a membrane structure, according to another embodiment of the present invention.

FIG. 3 shows a schematic representation of a membrane structure 20 according to one embodiment of the present invention. The membrane structure 20 of FIG. 3 includes a polymer layer 22 having a plurality of pores 23 and a ceramic layer 24 disposed on the polymer layer 22 and having two sublayers 26 and 28. The two sublayers 26 and 28 each have a plurality of substantially unconnected pores 27 and 29. Typically, each of the substantially unconnected pores 27 of the sub layer 26 is in fluid communication with at least one of the pores 23 of the polymer layer 12. In one embodiment, the sublayer exposed to the surface 21, such as the sublayer 26, has finer pore sizes than a sublayer disposed beneath it such as a sublayer 28. As used herein, finer pore sizes have median pore diameters smaller than the coarser pores. By tuning the pore dimensions, the properties of the membrane structure may be controlled to provide performance suitable for any of a number of applications.

In another embodiment, the sublayer exposed to the surface 21 such as the sublayer 26 has a coarser pore size than a sublayer disposed beneath it such as a sublayer 28. In all the above embodiments, the ceramic layer may include more than two sublayers depending on the requirement of the end use application. The thickness and pore dimensions of each of the layers are chosen depending on the end use application. The flow resistance of the layers with larger pores is less than or equal to the flow resistance of the layer with the smallest pores. Thus the flux through the membrane structure may be modified by tuning the pore diameters of different sublayers.

The membrane layers may be functionalized with a suitable functional group to achieve specific functional properties. The functional group, in some embodiments, may be an acid, a base, an amine, an amide, a carboxyl, a mercapto, a carbonyl, a hydroxyl, a vinyl, an alkyl, a benzyl, a silane, a fluoroalkyl, an acryl group, or a polyethylene glycol group. In an exemplary embodiment, the functional group comprises polyvinylpyrrolidone. In another exemplary embodiment, the functional group comprises polyethylene glycol.

These functional groups alter the surface properties of the membrane materials and impart specific properties to the membranes. For example, the functional groups may be used to change the wettability of the membrane pore surfaces to control the flow of fluid through the membrane. Functionalizing the pore surfaces may especially useful for biological or biomedical applications, where the membranes desirably may be fabricated to be hydrophilic, hydrophobic, lyophobic, or lyophilic. In such cases, the functional groups may be used to control the flow of specific chemical or biological species through the membrane. Specific functional groups may be used to control the attachment of cells or proteins to the membrane structure. For example, the layers may be functionalized with polyacrylamide, polyethylene glycol or polyvinylpyrrolidone to reduce adsorption of proteins for virus filtration applications. A general strategy for the selection of surface functional groups that resist protein adsorption includes 4 screening criteria; (i) The functionalized surface be desirably hydrophilic; (ii) The functionalized surface be desirably electrically neutral. (iii) The functionalized surface be desirably a hydrogen bond acceptor; and (iv) The functionalized surface be desirably not a hydrogen bond donor.

The functional groups may be disposed onto the membrane structure by any known technique. In some embodiments, the functional group may be attached to the selected regions of the layers by exposing the layers to solutions or vapors including the desired species. Functional groups may be covalently attached through silane coupling or grafting. Pretreatment of the layers to enhance the adhesion of the functional groups and masking of regions to be protected during coating may be required; ascertaining the need for and carrying out such alterations is commonly performed by those skilled in the art.

In a particular embodiment, a membrane structure 10 comprises a polymer layer 12 having a plurality of pores 14; and a ceramic layer 16 disposed on the polymer layer 12. The ceramic layer 16 comprises anodized alumina having a plurality of substantially unconnected pores 18. Each of the substantially unconnected pores 18 is in fluid communication with at least one of the pores 14 of the polymer layer 12. In another exemplary embodiment, the membrane structure 20 comprises: a polymer layer 22 having a plurality of pores 23; a first sublayer 28 disposed on the polymer layer, the first sublayer comprising anodized alumina having a plurality of substantially unconnected coarse pores 29; a second sublayer 26 disposed on the first sublayer, the second sublayer 26 comprising anodized alumina having a plurality of substantially unconnected fine pores 27. Each of the substantially unconnected fine pores 27 of the second sublayer 26 is in fluid communication with at least one of the pores 23 of the polymer layer 22.

Integration of the ceramic layer with the polymer support layer provides a high flux membrane with small pore sizes and which is mechanically robust. For separation applications, these membrane structures offer high selectivity due to fine pore sizes and tight pore size distributions. For filtration applications, these membranes exhibit sharp molecular weight cut-off (MWCO). These structures also permit high flux since the separation layers can be made thin, and the pore size and layer thickness may be independently controlled. These structures are of particular interest, for example, in biofiltration and bioseparation applications.

The membrane structure of some of the embodiments may be useful in a number of applications. In some embodiments, the membrane structure is part of a separation assembly. The ability of a membrane structure accomplish a desired separation depends, in part, on the relative permeability of the membrane structure for the feed phase components. For gas separation using porous membranes, the rate at which a component gas permeates a membrane structure depends upon the type of gas, the size of the pores, and interactions between the gas and membrane material. In certain embodiments where the pore size is smaller than the mean free path of the gas mixture, the membrane structure may be used to separate gases using the Knudsen diffusion mechanism. Molecular sieve effect may be the prominent separation process when the pore diameters are in between the molecular sizes of the gas molecules to be separated.

For liquid separations, the separation may be by reverse osmosis, where solutes dissolve in the membrane material or in the functional material disposed therein, and diffuse down a chemical potential gradient. Alternately, separation may also be achieved by using charged membranes or species within the pores. For such applications, the layers may be surface-modified or a suitable functional material may be applied on one or more layers of the membrane structure.

The membrane structure may be used as a liquid-liquid separation assembly such as separation of water from fluid containing organic components. For such applications, the membrane structure may be combined with other porous or non-porous separation layers if needed. The pore structure and thickness of each of the layers may be adjusted depending on the requirement. In some embodiments, the membrane structure may be a membrane structure in a separation assembly that also includes a reactive component coated on the pore walls to prevent fouling.

In one embodiment, the membrane structure is part of a filtration assembly. The permeants may be transported through the membrane structure under the driving force of a pressure, concentration, or an electric field. By controlling the pore dimensions of the layers, the membrane structure may be used for microfiltration to filter out solid particles with dimensions less than about 10 micrometers; or for ultrafiltration to filter out particles with dimensions down to about 50 nanometers such as separation of macromolecules, proteins, and bacteria.

Although ultrafiltration and microfiltration are conceptually similar processes, the difference in pore diameter (or apparent pore diameter) may produce differences in the way the membranes are used. A simple model of liquid flow through these membranes is to describe the membrane as a series of cylindrical capillary pores of diameter d. The liquid flow through a pore (q) is given by Poiseuille's law as:

$$q = (\pi d^4/(128\mu l)) \times \Delta p \quad (1.1)$$

where $\Delta p$ is the pressure difference across the pore, $\mu$ is the liquid viscosity, and l is the pore length. The flux, or flow per unit membrane area, is the sum of all the flows through the individual pores and so is given by:

$$J = N \cdot (\pi d^4/(128\mu \times l)) \times \Delta p \quad (1.2)$$

where N is the number of pores per square centimeter of membrane.

For membranes of equal pore area and porosity ($\epsilon$), the number of pores per square centimeter is proportional to the inverse square of the pore diameter.

That is, $N = \epsilon \times (4/\pi d^2)$ \quad (1.3)

It follows that the flux, given by combining Equations (1.2) and (1.3), is $$J = (\Delta p \epsilon/(32\mu l)) \times d^2 \quad (1.4)$$

The typical pore diameter of a microfiltration membrane is 1000 nanometers. This is 100-fold larger than the average ultrafiltration pore. (This derivation ignores electrical double layer effects, which become important in low ionic strength solutions or pores with diameter less than the Debye length [generally 0.1-10 nm or so depending on ionic strength]. These effects will serve to further reduce the flow through smaller pores.) Because fluxes are proportional to the square of pore diameter, the permeance, i.e., flux per unit pressure difference ($J/\Delta p$) of microfiltration membranes is higher than that of ultrafiltration membranes. These differences may impact the operating pressure and the way that these membrane structures are used. By designing and fabricating membrane structures with desirable pore size ranges, they may be used to filter out different species.

Figure 4:
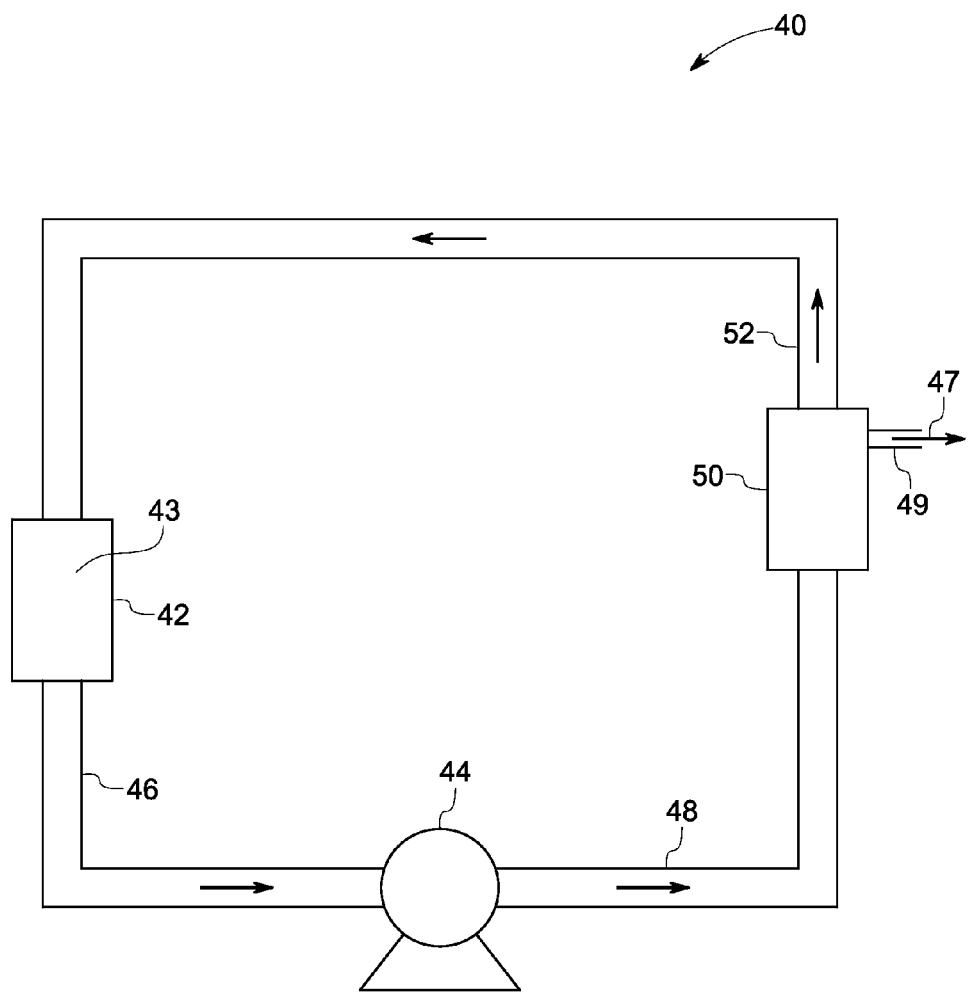
FIG. 4 is a schematic representation of a filter incorporating membrane structure of the invention, according to one embodiment of the invention.

FIG. 4 shows a schematic representation of a simple filter unit 40 according to one embodiment of the invention. The unit 40 includes a feed tank 42 used for storing the liquid medium containing the material to be separated. The circulation of the feed 43 may be controlled by the pump 44 that draws the feed 43 through lines 46 and 48 into a membrane filter assembly 50. The membrane filter assembly 50 includes one or more of the membrane structure, described above, configured to filter out a specific component from the feed. The desired component 'filtrate' 47 passes through outlet 49, while the retentate 52 may be removed or returned to the feed tank 42.

In an exemplary embodiment, the filter unit 40 comprises a water filtration assembly. In such filtration assemblies, the membrane structure may be used to separate water and microsolutes from macromolecules and colloids. The membrane structures in a typical ultrafiltration assembly may operate by separating water and small solutes; and rejecting the larger dissolved or suspended materials. Typically the driving force for water permeation is provided by applying an elevated pressure to the feed liquid, or a reduced pressure on the permeate side, or both. At low pressure, the water flux increases with increase in pressure difference. The material composition of the layers, the pore diameters of the layers, and the layer thicknesses are optimized depending on the filter design and the operating conditions.

Membrane structures are generally susceptible to fouling due to contaminants such as charged solutes, oils, bacteria, colloidal particles, and various other colloidal particles. To prevent membrane fouling, the layers may be surface modified with suitable functional groups. Certain hydrophilic polymers that are prone to swell upon exposure to water, but are at least partially water soluble, such as block copolymers of polyimide and polyether, are known to promote high water flux and anti-fouling properties to membranes. Accordingly, in certain embodiments, layers comprising such polymers may be included within the membrane structures.

In another exemplary embodiment, the filter unit 40 comprises a bioseparation assembly. The pore size and thickness of the membrane layers are chosen depending on the sizes of the species to be separated. In one embodiment, the membrane structure is a part of a protein purification unit. In embodiments where the membrane structure is used with a biological fluid, the membrane layers may be treated with an agent to reduce the affinity of the membrane relative to certain biological components. An example of such an agent is polyvinylpyrrolidone, which reduces the affinity of certain proteins to ceramic surfaces.

In an exemplary embodiment, the filter unit 40 comprises a virus filtration (biofiltration) assembly. The pore diameters are chosen depending on the dimension of the biomolecules to be filtered. In a typical virus filtration application, virus removal of greater than at least about 3 logs; and liquid flux rate of higher than 10 L/h/m$^2$/psi may be desirable. In some embodiments virus removal of greater than about 5 logs may be needed. In the case of separating viruses from solutions containing proteins, a high protein transmission of greater than at least about 90% may be required. In some embodiments, protein transmission greater than about 98% may be preferred. The membrane pore dimensions and layer thicknesses are accordingly chosen. For example, removal of some enveloped viruses may be achieved using a 35 nm filter, while, removal of some types of non-enveloped viruses may require a 20 nm filter for efficient removal.

In another example, a biofiltration assembly that retains viruses at greater than 3 logs while transmitting proteins at greater than 90% may be fabricated using a membrane structure. As discussed above, the membrane structure comprises a polymer layer comprising a plurality of pores, wherein the polymer layer comprises a polymer selected from the group consisting of polyether sulfone, polyvinylidene fluoride, and polytetrafluoroethylene; a ceramic layer comprising a plurality of substantially unconnected pores, disposed on the polymer layer, wherein the ceramic layer comprises an oxide selected from the group consisting of alumina, titania, and zirconia, the ceramic layer has an average pore diameter between 5-50 nm; and wherein each of the substantially unconnected pores is in fluid communication with at least one of the pores of the polymer layer. The ceramic layer may be functionalized with a functional group selected from the group consisting of polyacrylamide, polyethylene glycol, and polyvinylpyrrolidone, in order to reduce adsorption of proteins.

Figure 5:
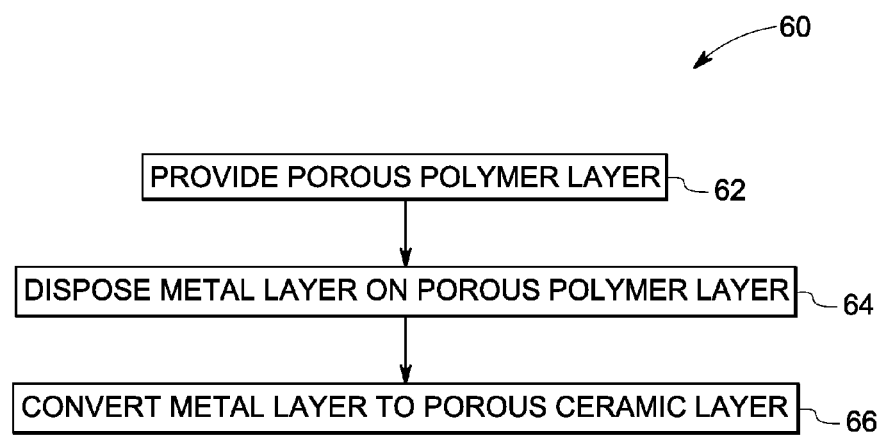
FIG. 5 is a flow chart of a method of making membrane structure, according to one embodiment of invention.

Another aspect of the invention is to provide a method for preparing a membrane structure. A flow diagram of the method for making a membrane structure is shown in FIG. 5. The method 60 begins with step 62, wherein a porous polymer layer having a plurality of pores is provided. In step 64, a metal coating is deposited on the porous substrate. In step 66, the metal layer is coated with a mask on the surface, and anodized through the porous substrate, typically in an acidic medium, to convert the metal layer into a porous layer.

Figure 6:
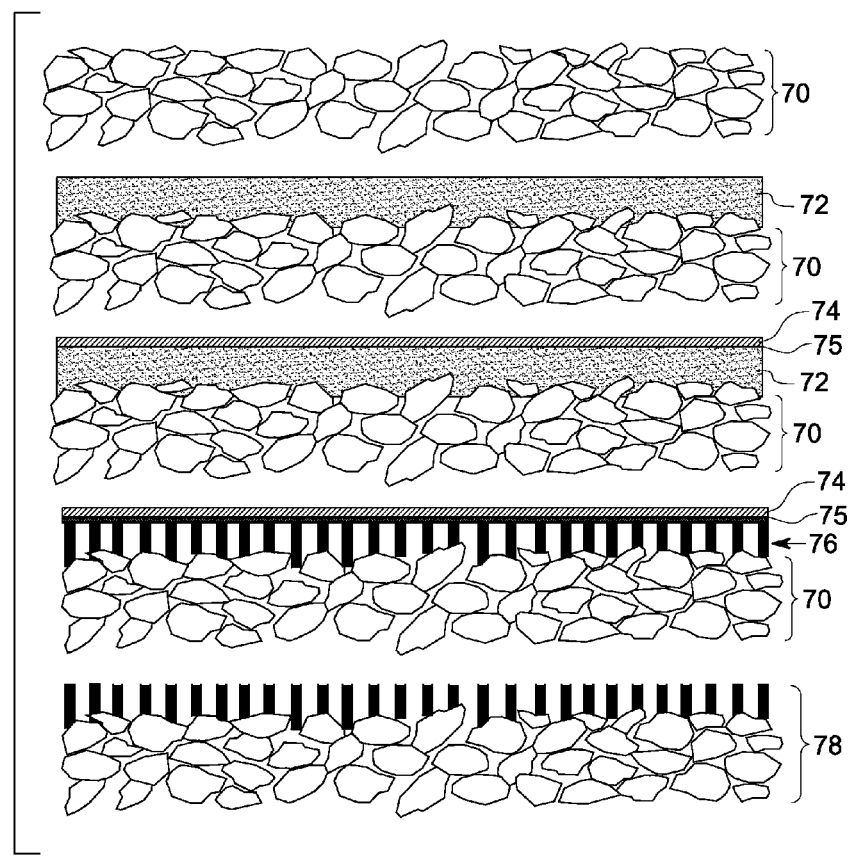
FIG. 6 is a schematic representation of a method of making membrane structure, according to one embodiment of invention.

In FIG. 6, the schematic of the process steps are shown. To begin with, a porous polymer layer 70 is provided. Any technique known in the art to make porous polymer layers may be used. For example, a thermoplastic, or a thermoplastic elastomer, or a thermoset polymer may be mixed with a porogen and cast into a thin layer of desired thickness. The layer may be heat treated or exposed to light or any other radiation to convert the layer into a porous layer. When the polymer chosen is a blend of two polymers, it is possible to control the casting conditions, such as the solvents used, to get a porous layer by phase separation. Alternatively, commercially available porous polymer sheets may be used.

In step 64, a metal coating 72 is disposed on the polymer layer 70. The thickness of the ceramic layer is determined by the thickness of the deposited metal coating. Any coating technique known in the art may be used for depositing the metal layer. Some examples of suitable coating techniques include, but are not limited to, exposing the structure to a suspension of particulates, electroless deposition, physical vapor deposition techniques such as thermal evaporation, electron beam evaporation, or sputter deposition, and chemical vapor deposition including atomic layer deposition.

In step 66, the metal coating is protected with a mask 74 and the metal layer 72 is anodized in an acid electrolyte through the porous polymer layer 70. That is, the metal layer 72 is converted into a ceramic layer via anodization, starting from the interface between the metal layer 72 and the polymer layer 70; and progressing outward towards the outer surface 75 of the metal layer 72. It is known that certain materials such as aluminium, silicon, tin, titanium, zirconium, niobium, tungsten, molybdenum, tantalum, and their alloys form a porous oxide layer when anodized in an acid medium. The simultaneous formation of an oxide layer at the metal layer surface, and dissolution of the formed oxide into the acid gives rise to a particular porous structure. The porous structure includes a plurality of cylindrical pores of uniform size. Typically, a strong acid such as phosphoric, sulfuric, or oxalic acid is used as an electrolyte.

The pore size and the spacing between the pores may be controlled by adjusting the current and voltage during anodic oxidation. The nature of these adjustments and their effects on oxide morphology are well known in the art. The thickness of the formed oxide film 76 is controlled by anodization duration. Anodization may be stopped when the desired thickness of the porous oxide film is grown. After protecting the oxide porous layer 76, the remaining metal and the passivation layer between the porous oxide layer 76 and the polymer substrate 70 may be removed by etching to obtain a membrane structure 78.

Anodizing the metal starting at the polymer-metal interface, rather than starting at the outer surface 75 of the metal layer 72, ensures connectivity between each pore formed during anodization, and the pores of the porous support layer. Generally, each of the pores of the oxide film 76 is in fluid communication with at least one of the pores of the porous substrate 70. By anodizing from the interface, the thickness of the anodized layer 76 may be controlled to be smaller than the thickness of the starting metal layer.

Membrane structures of the prior art that incorporate anodized oxide layers are typically fabricated by separating the porous metal oxide layer from its substrate, and bonding the oxide layer with a partly sintered particle layer. The integrated membrane structure in accordance with embodiments of the present invention is superior to such "laminated" structures since they have better mechanical adhesion between the layers due to atomic scale contact between the layers; more definite fluid communication between the pores of the two layers; and scalability and ease of manufacturability. Integration of the ceramic layer with the polymer support layer provides a high flux membrane with small pore sizes, and which is mechanically robust. Further, such membrane structures may be manufactured in large sizes and formed into membrane assemblies of various shapes.

The porosity of the ceramic separation layer (typically about 50%) is much higher than the porosity of the corresponding layers in the membrane structures presently in use (about 1%). This translates into an increased flux, which is a critical parameter in nanofiltration applications. Fine pore size control, independent thickness control, and high porosity of the ceramic separation layer are the key advantages. Nanoceramic separation layers are traditionally integrated with porous ceramic substrates because the firing temperature to create the separation layer is often high enough to require a ceramic support. However, fabrication of ceramic support layers may expensive to scale to high volume.

Figure 7:
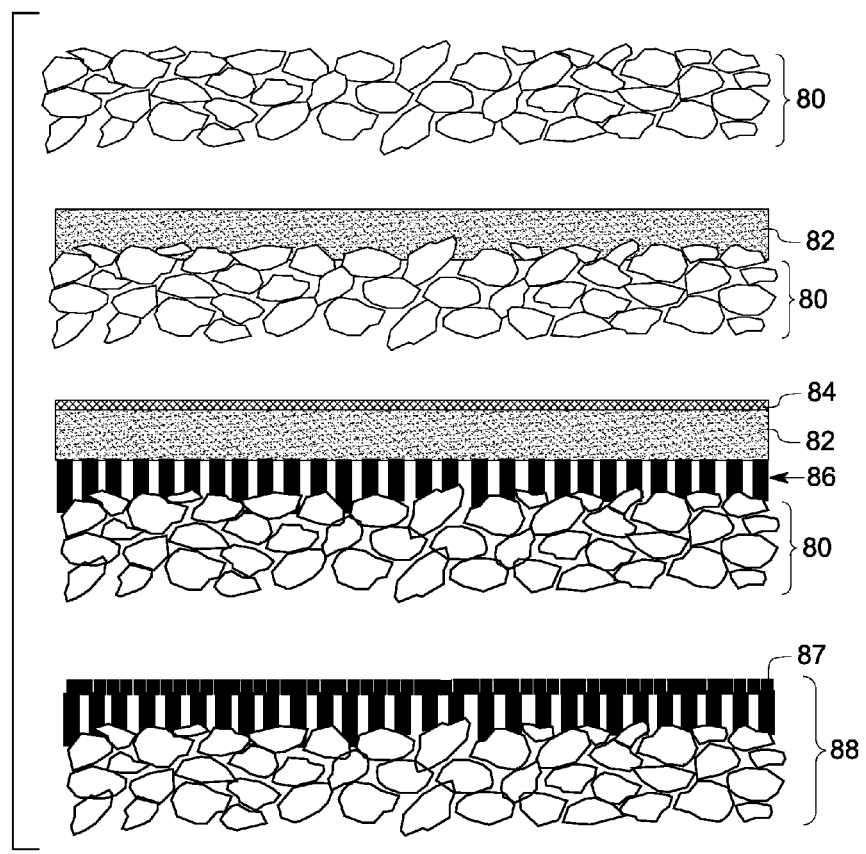
FIG. 7 is a schematic representation of a method of making membrane structure, according to another embodiment of invention.

It is possible to fabricate membrane structures with different configurations by tuning the anodization conditions. For example, the method of making a membrane structure according to another embodiment of the invention is shown as a schematic diagram in FIG. 7. In this case, first a porous polymer layer 80 having a plurality of interconnected pores is provided. Next, a metal layer 82 is deposited on the porous substrate. The metal layer 82 is coated with a protective layer 84 on the surface and anodized at a particular voltage through the porous substrate 80 in an acidic medium, to convert the metal layer 82 into a porous sublayer 86 with a particular pore dimension. Once the desired thickness of the sublayer 86 is formed, the structure is anodized at a reduced anodization voltage to obtain a sublayer 87 with finer pores.

It is possible to introduce any number of sublayers with sequentially differing pore dimensions to fabricate asymmetric membranes, by tuning the anodization current or voltage. Finally, the passivation layer between the substrate 80 and the metal oxide layer may be removed to obtain an asymmetric membrane structure 88. Alternatively, layers with non-monotonically graded pore sizes may be fabricated by anodizing from the top surface as well as through the porous polymer layer. In such embodiments, the layers with the smallest pores may be obtained at the center of the anodized layer.

The method 60 may further comprise the step of functionalizing at least one of the layers. Typically, functionalizing the layer comprises exposing the layer to a species comprising a functional group. The species may be provided as a vapor phase or a liquid phase. As used herein, a "functional group" defines a chemical species that that confers a particular chemical property to a substrate on which it is deposited.

Figure 8:
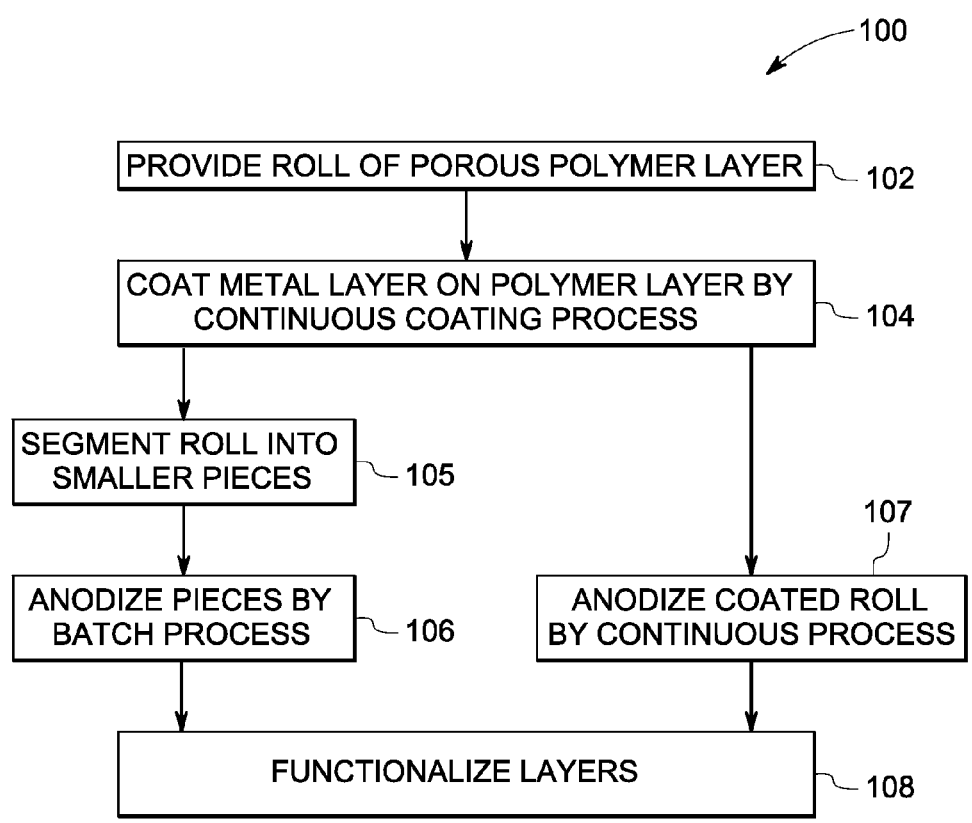
FIG. 8 is a flow chart of a method of manufacturing a membrane structure, on an industrial scale, according to one embodiment of invention.

The methods described above may be used to manufacture membrane structures on a large scale. In certain embodiments, at least one of the depositing step and the anodizing step (meaning either step, or both steps) is performed as a continuous process. In one embodiment, the depositing step is performed as a continuous process. FIG. 8 shows a flow chart for manufacturing a membrane structure on a large scale. The method 100 comprises the steps of providing a roll of porous polymer layer in step 102, coating a metal layer onto the polymer layer by a continuous coating process in step 104. After the coating step, the coated roll may be segmented into smaller pieces in step 105, followed by batch anodization of samples in step 106. Alternatively, the coated roll may be anodized by a continuous process in step 107. Prior to anodization, the top surface of the coated layer may be masked to facilitate anodization through the porous polymer membrane, rather than from the top surface. Alternatively, depositing may be performed as a batch process. In step 108, at least one of the layers may be functionalized. In one embodiment, functionalizing the layer is performed as a continuous process, for example by a continuous process, wherein the anodized material is unrolled and immersed into or sprayed with a solution of functional species, exposed to a drying process, and then rolled up for further processing, or for shipping as a finished product. Alternatively, functionalizing the layer may be performed as a batch process.

In an exemplary embodiment, the method of manufacturing a membrane structure comprises: providing a polymer layer comprising a plurality of pores; depositing a metal layer on the polymer; anodizing the metal layer to convert the metal layer into a porous alumina layer. In particular embodiments, as described above, at least one of the depositing step and the anodizing step is performed as a continuous process.

The following examples describe the preparation method for making anodized alumina membrane structures.

EXAMPLE 1

Method for Fabricating a Membrane Structure of Anodized Alumina on a Porous Polyethersulphone Support Layer A continuous aluminum coating of thickness of about 1 micrometer was deposited on a porous polyethersulfone support. Polyethersulfone support layer has an average pore size of about 0.22 micrometers. The aluminum surface was masked with a lacquer mask and then anodized through the porous support. Anodization was done in 0.3 M oxalic acid at voltages greater than 20 V. The anodized alumina pore diameter was controlled, in large part, by the anodization voltage. The anodized alumina layer thickness was determined by anodization time. Once the anodized alumina layer was of the desired thickness, anodization was stopped. The polyethersulfone membrane was protected, the lacquer mask was dissolved with a suitable solvent, and the remaining unconverted aluminum was etched using a copper chloride solution. Finally, a barrier oxide layer was etched away using 5 wt % phosphoric acid to reveal the top surface of the porous alumina layer. Scanning electron microscopy was used to study the pore structure of the anodized layer. The typical pore size of the alumina layer was about 20 nanometers. Cross sectional scanning electron micrography showed good connectivity between the pores of the polymer and the ceramic layers.

EXAMPLE 2

Method for Fabricating a Membrane Structure of Asymmetric Anodized Alumina on a Porous Polyethersulfone Support Layer A continuous aluminum coating of thickness in the range of 1 micrometer to 2 micrometers was deposited, by evaporation, on a porous polyethersulfone support. The aluminum surface was masked with lacquer, and then anodized through the porous support. Anodization was conducted in oxalic acid at voltages greater than 20 V, as described above. Once the anodized alumina layer was of the desired thickness, anodization voltage is decreased to generate a porous sublayer with finer pores than those of the layer formed at 20V. Multiple alumina sublayers with decreasing pore size was fabricated by sequential reduction in anodization voltage. Any remaining aluminum was etched using a copper chloride solution. Finally, the barrier oxide layer was etched away using 5 wt % phosphoric acid to reveal the top surface of the porous alumina layer.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for manufacturing a membrane structure, the method comprising:
   providing a polymer layer having a plurality of pores; and
   disposing a porous ceramic layer on the polymer layer,
      wherein disposing the ceramic layer comprises
      depositing a metal layer on the polymer layer,
      depositing a protective layer on the metal layer, and
      anodizing the metal layer through the polymer layer to convert the metal layer into the porous ceramic layer;
   wherein the porous ceramic layer comprises a plurality of substantially unconnected pores, wherein each of the substantially unconnected pores is in fluid communication with at least one of the pores of the polymer layer.

2. The method of claim 1, wherein at least one of the depositing and the anodizing steps is performed as a continuous process.

3. The method of claim 1, wherein the depositing step is performed as a continuous process.

4. The method of claim 1, wherein at least one of the depositing and the anodizing steps is performed as a batch process.

5. The method of claim 1, wherein anodizing step is performed as a batch process.

6. The method of claim 1, further comprising functionalizing at least one of the layers.

7. The method of claim 6, wherein functionalizing the layer comprises exposing the layer to a species comprising a functional group.

8. The method of claim 6, wherein the functionalizing species is provided as a vapor phase or a liquid phase.

9. The method of claim 6, wherein functionalizing the layer is performed as a continuous process.

10. The method of claim 6, wherein functionalizing the layer is performed as a batch process.

11. A method of manufacturing a membrane structure, the method comprising:

provide a polymer layer comprising a plurality of pores;

depositing a metal layer on the polymer;

depositing a protective layer on the metal layer; and anodizing the metal layer though the polymer layer to convert the metal layer into a porous ceramic layer;

wherein at least one of the depositing step and the anodizing step is performed as a continuous process.

* * * * *